(12) United States Patent
Jain et al.

(10) Patent No.: US 12,260,220 B2
(45) Date of Patent: Mar. 25, 2025

(54) ACCELERATING FETCH TARGET QUEUE (FTQ) PROCESSING IN A PROCESSOR

(71) Applicant: Microsoft Technology Licensing, LLC, Redmond, WA (US)

(72) Inventors: Saransh Jain, Raleigh, NC (US); Rami Mohammad Al Sheikh, Morrisville, NC (US); Daren Eugene Streett, Cary, NC (US); Michael Scott McIlvaine, Raleigh, NC (US); Somasundaram Arunachalam, Raleigh, NC (US)

(73) Assignee: Microsoft Technology Licensing, LLC, Redmond, WA (US)

(*) Notice: Subject to any disclaimer, the term of this patent is extended or adjusted under 35 U.S.C. 154(b) by 21 days.

(21) Appl. No.: 18/083,249

(22) Filed: Dec. 16, 2022

(65) Prior Publication Data
US 2024/0201999 A1    Jun. 20, 2024

(51) Int. Cl.
G06F 9/38 (2018.01)
(52) U.S. Cl.
CPC .......... *G06F 9/3806* (2013.01); *G06F 9/3802* (2013.01); *G06F 9/3808* (2013.01); *G06F 9/3814* (2013.01)
(58) Field of Classification Search
CPC .... G06F 9/3808; G06F 9/3806; G06F 9/3814; G06F 9/3802
See application file for complete search history.

(56) References Cited

U.S. PATENT DOCUMENTS

| 6,678,815 | B1 | 1/2004 | Mathews | |
| 2003/0196044 | A1* | 10/2003 | Ramirez | G06F 9/3802 |
| | | | | 712/E9.055 |
| 2012/0047329 | A1 | 2/2012 | Goel | |
| 2019/0155608 | A1* | 5/2019 | Perais | G06F 12/0875 |
| 2021/0026770 | A1* | 1/2021 | Ishii | G06F 9/3802 |
| 2021/0318877 | A1 | 10/2021 | Gong | |
| 2022/0342671 | A1* | 10/2022 | Schinzler | G06F 9/3802 |

OTHER PUBLICATIONS

Reinman, et al., "A Scalable Front-End Architecture for Fast Instruction Delivery", In journal of ACM SIGARCH Computer Architecture News, vol. 27, Issue 2, May 1, 1999, pp. 234-245.
International Search Report and Written Opinion received for PCT Application No. PCT/US2023/035745, Feb. 19, 2024, 13 pages.

* cited by examiner

*Primary Examiner* — Courtney P Spann
(74) *Attorney, Agent, or Firm* — Withrow & Terranova, PLLC

(57) ABSTRACT

Accelerating fetch target queue (FTQ) processing is disclosed herein. In some aspects, a processor comprises an FTQ and an FTQ acceleration cache (FAC), and is configured to generate a FAC entry corresponding to an FTQ entry of a plurality of FTQ entries of the FTQ, wherein the FTQ entry comprises a fetch address bundle comprising a plurality of sequential virtual addresses (VAs), and the FAC entry comprises metadata for the FTQ entry. The processor is further configured to receive, using the FTQ, a request to access the FTQ entry. The processor is also configured to, responsive to receiving the request to access the FTQ entry, locate, using the FAC, the FAC entry corresponding to the FTQ entry among a plurality of FAC entries of the FAC. The processor is additionally configured to perform accelerated processing of the request to access the FTQ entry using the metadata of the FAC entry.

20 Claims, 9 Drawing Sheets

ACCELERATING FETCH TARGET QUEUE (FTQ) PROCESSING IN A PROCESSOR

FIELD OF THE DISCLOSURE

The technology of this disclosure relates to fetching of instructions for execution in a microprocessor ("processor"), and, in particular, to processing the contents of fetch target queues (FTQs).

BACKGROUND

The execution performance of a conventional modern processor is limited by the fetch performance of the processor's "front end," which refers generally to the portion of the processor that is responsible for fetching and preparing instructions for execution. The front-end architecture of the processor may employ a number of different approaches for improving fetch performance. One approach involves the use of an instruction cache, which is a memory device that has a smaller capacity than system memory, but that can be accessed faster by the processor due to the type of memory used and/or the physical location of the cache relative to the processor. The instruction cache can be used to improve fetch performance by storing copies of instructions that were previously retrieved from frequently accessed memory locations in the system memory or from another, higher-level cache (i.e., a cache further from the processor).

Another approach involves using a branch predictor to speculatively predict a path to be taken by a branch instruction (based on, e.g., the results of previously executed branch instructions), and basing the fetching of subsequent instructions on the branch prediction. When the branch instruction reaches the execution stage of the processor's instruction pipeline and is executed, the resulting target address of the branch instruction is verified by comparing it with the previously predicted target address when the branch instruction was fetched. If the predicted and actual target addresses match (i.e., the branch prediction was correct), instruction execution can proceed without delay because the subsequent instructions at the target address will have already been fetched and will be present in the instruction pipeline.

To further improve the fetching performance of the processor, the processor may implement a decoupled front-end architecture in which a structure known as a fetch target queue (FTQ) is inserted between the instruction cache and the branch predictor. The branch predictor in such processors generates fetch address bundles, containing blocks of sequential virtual addresses (VAs), that are inserted as FTQ entries into the FTQ. The instruction cache then retrieves each FTQ entry and fetches the instructions indicated by the VAs in each fetch address bundle. In this manner, the FTQ decouples the instruction cache and the branch predictor by acting as a buffer that enables the branch predictor to continue generating branch predictions even if an access to the instruction cache results in a miss.

However, a miss to the instruction cache may still negatively impact fetch performance even when using a decoupled front-end architecture by slowing the rate at which FTQ entries can be processed. Occurrences of instruction cache misses may be reduced by increasing the size of the instruction cache and by using more intelligent replacement policies when evicting contents from the instruction cache. Larger instruction caches, though, may incur higher access latency, and may require the consumption of more energy per access. The latency and energy costs incurred by instruction cache accesses may be exacerbated when processing an FTQ entry that requires multiple accesses to the instruction cache, such as when an FTQ entry spans multiple cache lines, or when a read of an instruction cache entry provides only a subset of the requested cache line.

SUMMARY

Aspects disclosed herein include accelerating fetch target queue (FTQ) processing in a processor. In one exemplary aspect, the processor includes an FTQ acceleration cache (FAC) containing a plurality of FAC entries that each corresponds to an FTQ entry of a plurality of FTQ entries of an FTQ of the processor. The processor generates each FAC entry (e.g., when enqueueing a corresponding FTQ entry) comprising metadata for the corresponding FTQ entry, which can be used to accelerate the processing the FTQ entry. Upon receiving a subsequent request for access to the FTQ entry, the processor locates the FAC entry in the FAC, and performs accelerated processing of the request using the metadata of the FAC entry. In this manner, the FAC may reduce power consumption by avoiding redundant accesses to an instruction cache of the processor and may enable higher throughput by improving fetch performance. The FAC may further improve processor performance by accelerating the discovery of future cache misses and avoiding potential structure hazards (e.g., port conflicts or port limitations) in the instruction cache.

In some aspects, the metadata may comprise a translation mapping corresponding to a fetch address bundle of the corresponding FTQ entry. The processor in such aspects may obtain the translation mapping as part of the process of generating the FAC entry, and may subsequently perform accelerated processing of the request by using the translation mapping when fetching the instructions corresponding to a plurality of sequential virtual addresses (VAs) of the fetch address bundle. Some such aspects further provide that the processor, upon detecting a change in a translation state the translation mapping, may invalidate all of the FAC entries in the FAC, or may invalidate the only specific FAC entry based on a tag storing the translation state of the FAC entry.

According to some aspects, the metadata may comprise a set value and a way value that indicate a set and a way, respectively, in which a cache line of a plurality of cache lines corresponding to the plurality of sequential VAs is stored in an instruction cache of the processor. The processor in such aspects may identify the set and the way of the instruction cache in which the cache line is stored in the instruction cache after generating the FAC entry, and may then update the set value and the way value of the FAC entry to indicate the set and the way. The processor subsequently performs accelerated processing of the request by using a fetch circuit of the processor to access a data array of the instruction cache using the set value and the way value without accessing a tag array of the instruction cache. Some such aspects further provide that the FAC, upon detecting an eviction of the cache line from the instruction cache, may invalidate the entire FAC entry, or may set a valid indicator of the metadata to indicate that the corresponding set value and way value for the cache line are invalid.

Some aspects may provide that the metadata comprises one or more instructions corresponding to one or more VAs of the plurality of sequential VAs. In such aspects, the processor may perform accelerated processing of the request by using the fetch circuit to fetch the one or more instructions from the FAC entry instead of from the instruction cache of the processor. According to some aspects, the metadata may include one or more instructions corresponding to a first subset of the plurality of sequential VAs, and may further include a set value and a way value for each of one or more cache lines corresponding to a second subset of the plurality of sequential VAs.

In this regard, in another exemplary aspect, a processor for accelerating FTQ processing is disclosed. The processor comprises an FTQ and a FAC, and is configured to generate, using the FAC, a FAC entry corresponding to an FTQ entry of a plurality of FTQ entries of the FTQ, wherein the FTQ entry comprises a fetch address bundle comprising a plurality of sequential VAs, and the FAC entry comprises metadata for the FTQ entry. The processor is further configured to receive, using the FTQ, a request to access the FTQ entry. The processor is also configured to, responsive to receiving the request to access the FTQ entry, locate, using the FAC, the FAC entry corresponding to the FTQ entry among a plurality of FAC entries of the FAC. The processor is additionally configured to perform accelerated processing of the request to access the FTQ entry using the metadata of the FAC entry.

In another exemplary aspect, a method for accelerating FTQ processing is disclosed. The method comprises generating, using a FAC of a processor, a FAC entry corresponding to an FTQ entry of a plurality of FTQ entries of an FTQ of the processor, wherein the FTQ entry comprises a fetch address bundle comprising a plurality of sequential VAs, and the FAC entry comprises metadata for the FTQ entry. The method further comprises receiving a request to access the FTQ entry. The method also comprises, responsive to receiving the request to access the FTQ entry, locating, using the FAC, the FAC entry corresponding to the FTQ entry among a plurality of FAC entries of the FAC. The method additionally comprises performing accelerated processing of the request to access the FTQ entry using the metadata of the FAC entry.

In another exemplary aspect, a non-transitory computer-readable medium having stored thereon computer-executable instructions is disclosed. The computer-executable instructions cause a processor to generate a FAC entry corresponding to an FTQ entry of a plurality of FTQ entries of an FTQ of the processor, wherein the FTQ entry comprises a fetch address bundle comprising a plurality of sequential VAs, and the FAC entry comprises metadata for the FTQ entry. The computer-executable instructions further cause the processor to receive a request to access the FTQ entry. The computer-executable instructions also cause the processor to, responsive to receiving the request to access the FTQ entry, locate, within a FAC, the FAC entry corresponding to the FTQ entry among a plurality of FAC entries of the FAC. The computer-executable instructions additionally cause the processor to perform accelerated processing of the request to access the FTQ entry using the metadata of the FAC entry.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 4:
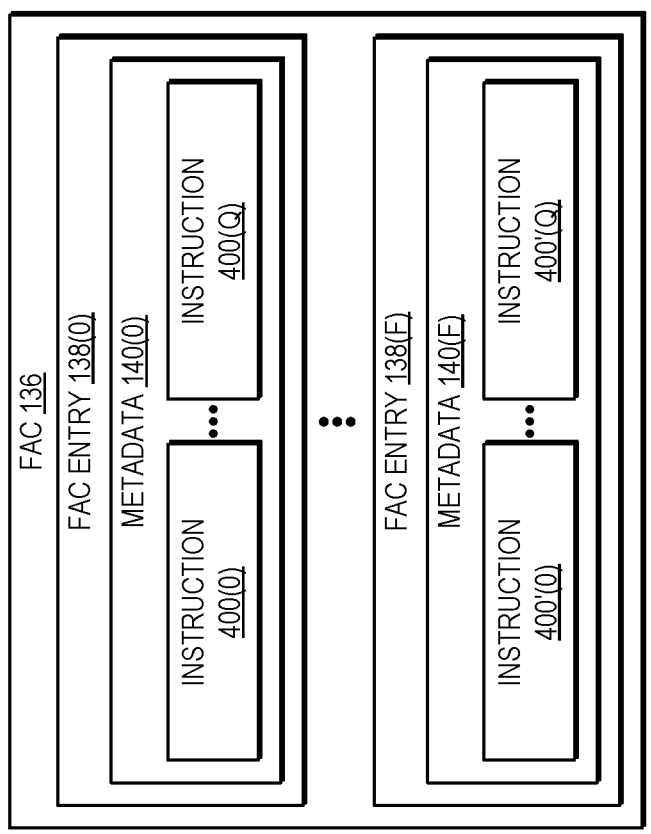
FIG. 4 is a diagram illustrating an exemplary FAC in which metadata includes instructions corresponding to VAs in a corresponding FTQ entry, according to some aspects.
Figure 5:
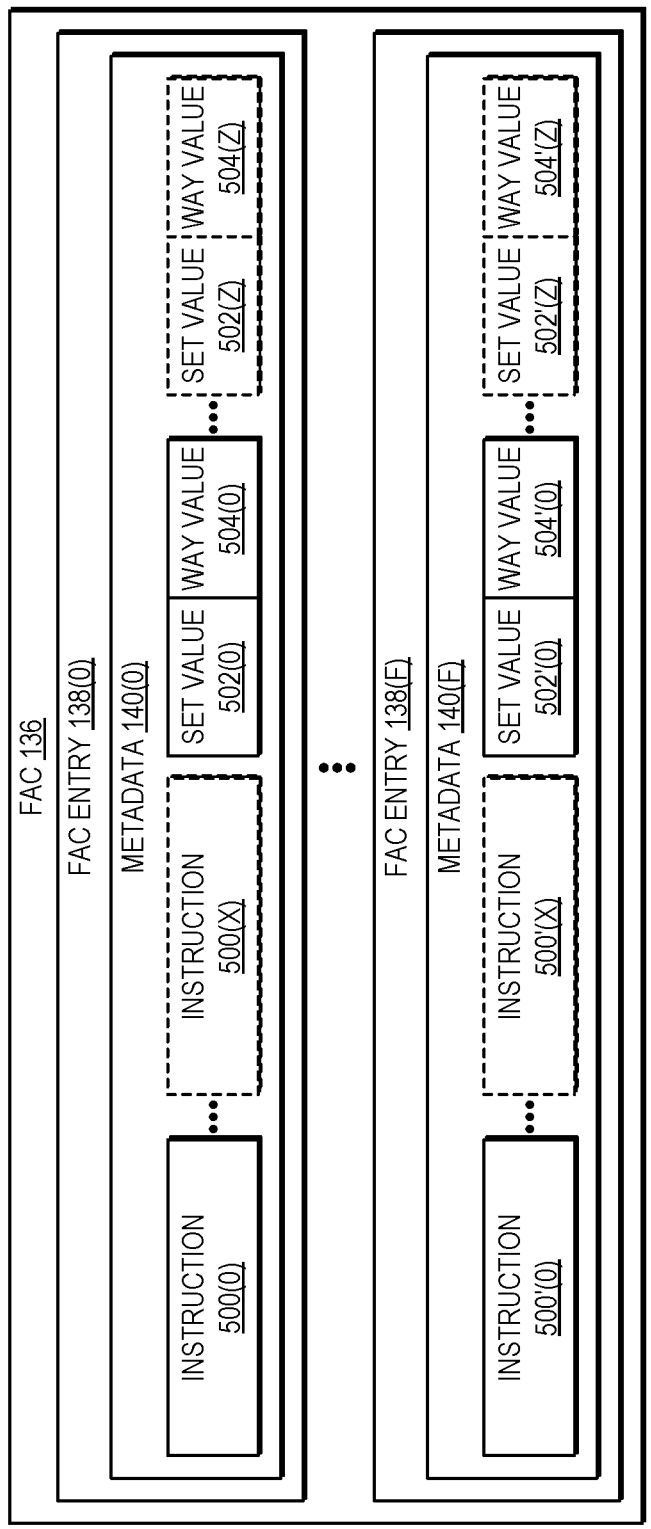
FIG. 5 is a diagram illustrating an exemplary FAC in which metadata includes both instructions corresponding to a first subset of VAs in a corresponding FTQ entry and set values and way values for cache lines corresponding to a second subset of VAs in the corresponding FTQ entry, according to some aspects.
Figure 6A:
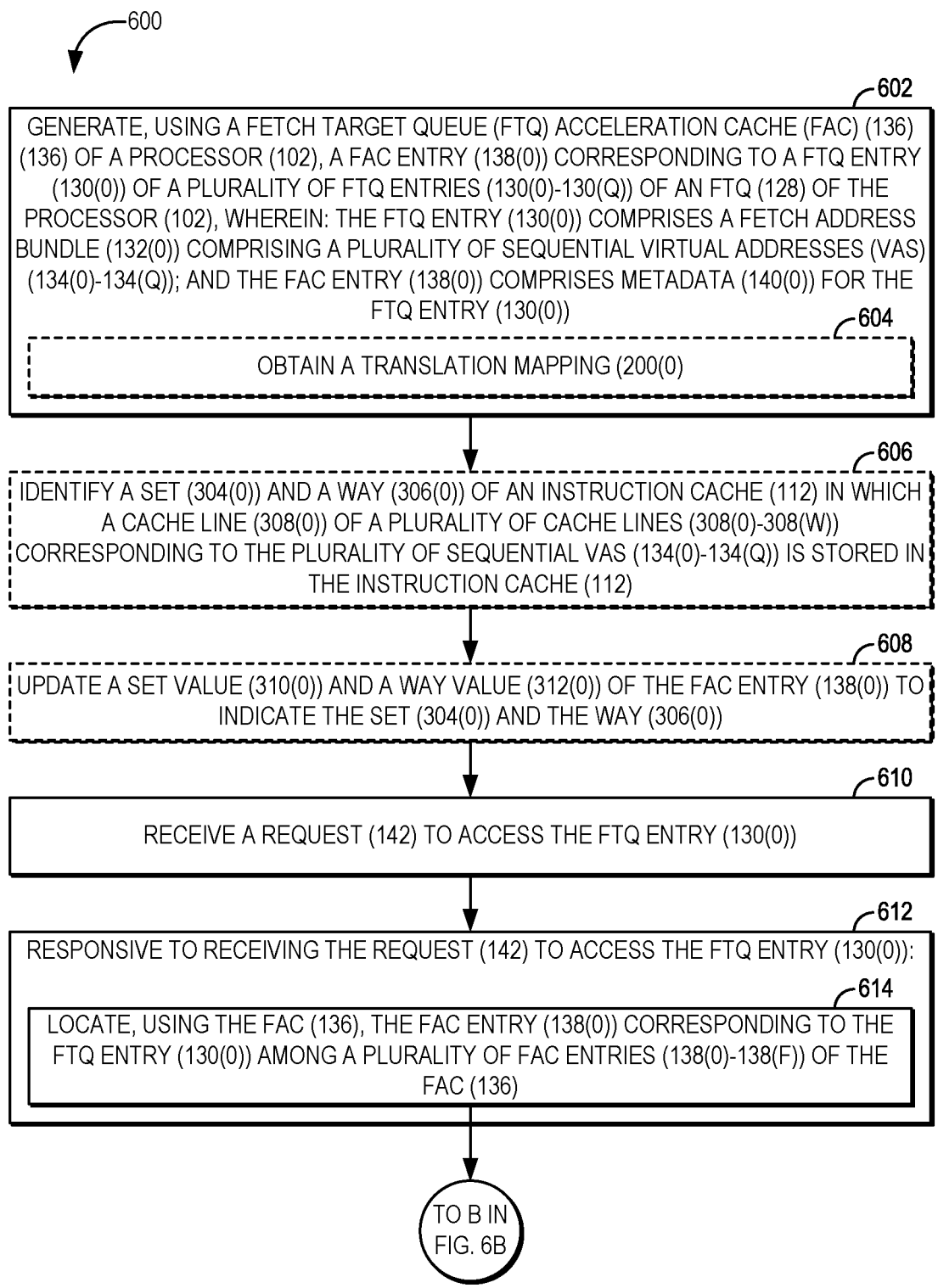
Figure 6B:
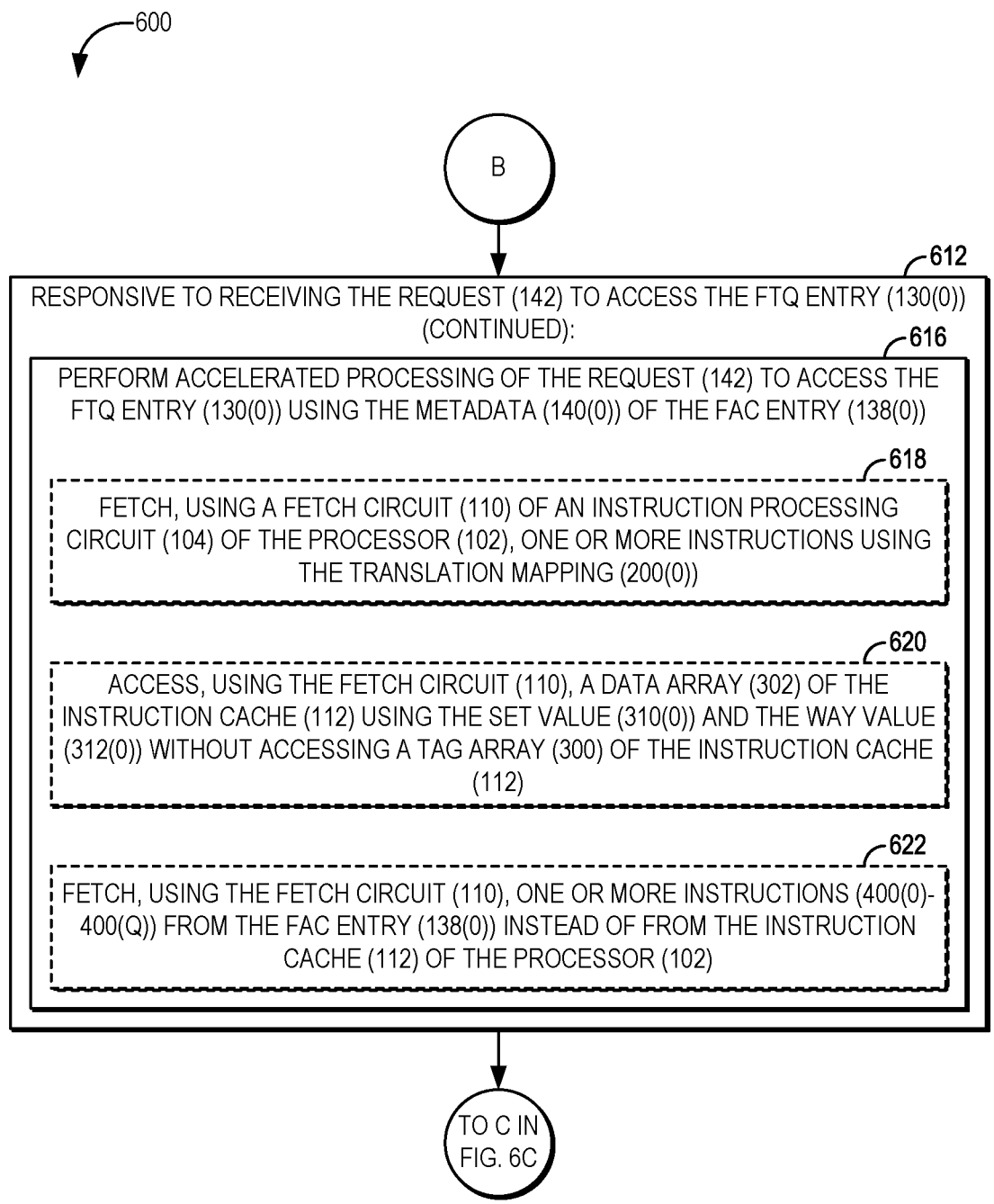
Figure 6C:
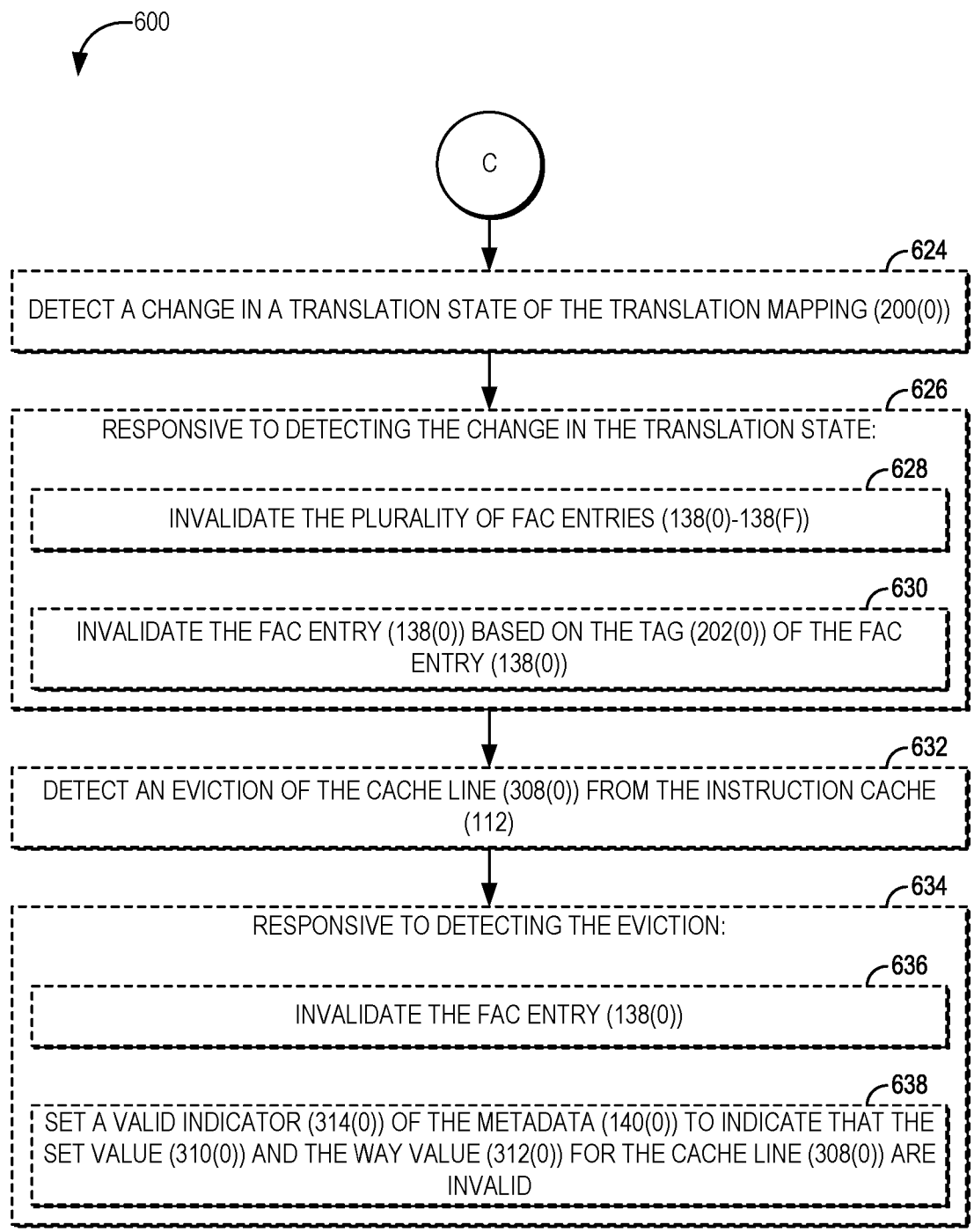
Figure 7:
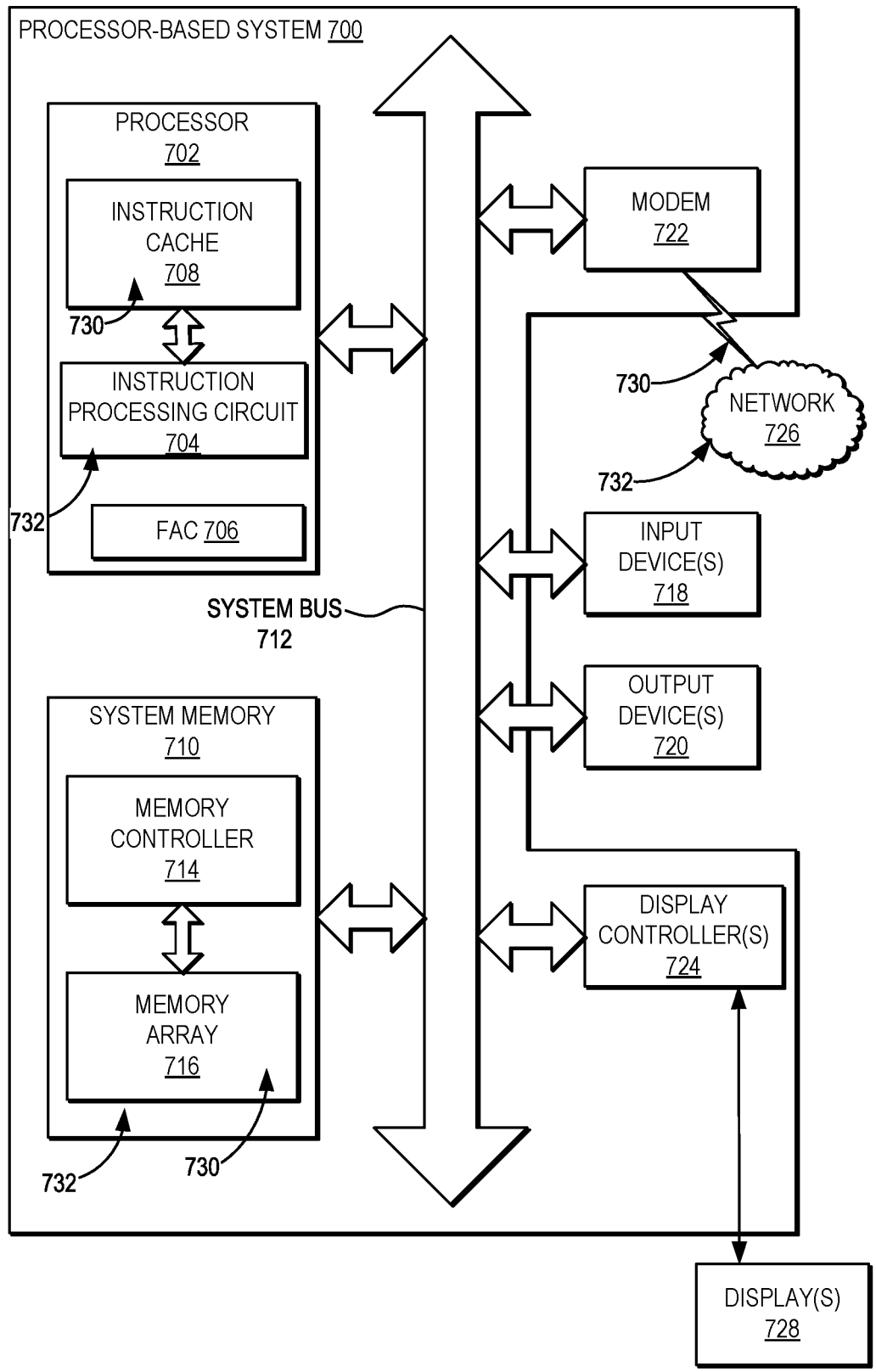

FIGS. 6A-6C provide a flowchart illustrating exemplary operations for accelerating FTQ processing using the FAC of FIGS. 1-5, according to some aspects; and FIG. 7 is a block diagram of an exemplary processor-based system that includes a processor that includes a FAC such as the FAC of FIGS. 1-5 for accelerating FTQ processing.

DETAILED DESCRIPTION

Aspects disclosed herein include accelerating fetch target queue (FTQ) processing in a processor. In one exemplary aspect, the processor includes an FTQ acceleration cache (FAC) containing a plurality of FAC entries that each corresponds to an FTQ entry of a plurality of FTQ entries of an FTQ of the processor. The processor generates each FAC entry (e.g., when enqueueing a corresponding FTQ entry) comprising metadata for the corresponding FTQ entry, which can be used to accelerate the processing the FTQ entry. Upon receiving a subsequent request for access to the FTQ entry, the processor locates the FAC entry in the FAC, and performs accelerated processing of the request using the metadata of the FAC entry. In this manner, the FAC may reduce power consumption by avoiding redundant accesses to an instruction cache of the processor, and may enable higher throughput by improving fetch performance. The FAC may further improve processor performance by accelerating the discovery of future cache misses and avoiding potential structure hazards (e.g., port conflicts or port limitations) in the instruction cache.

In some aspects, the metadata may comprise a translation mapping corresponding to a fetch address bundle of the corresponding FTQ entry. The processor in such aspects may obtain the translation mapping as part of the process of generating the FAC entry, and may subsequently perform accelerated processing of the request by using the translation mappings when fetching the instructions corresponding to a plurality of sequential virtual addresses (VAs) of the fetch address bundle. Some such aspects further provide that the processor, upon detecting a change in a translation state of the translation mapping, may invalidate all of the FAC entries in the FAC, or may invalidate the only specific FAC entry based on a tag storing the translation state of the FAC entry.

According to some aspects, the metadata may comprise a set value and a way value that indicate a set and a way, respectively, in which a cache line of a plurality of cache lines corresponding to the plurality of sequential VAs is stored in an instruction cache of the processor. The processor in such aspects may identify the set and the way of the instruction cache in which the cache line is stored in the instruction cache after generating the FAC entry, and may then update the set value and the way value of the FAC entry to indicate the set and the way. The processor subsequently performs accelerated processing of the request by using a fetch circuit of the processor to access a data array of the instruction cache using the set value and the way value without accessing a tag array of the instruction cache. Some such aspects further provide that the FAC, upon detecting an eviction of the cache line from the instruction cache, may invalidate the entire FAC entry, or may set a valid indicator of the metadata to indicate that the corresponding set value and way value for the cache line are invalid.

Some aspects may provide that the metadata comprises one or more instructions corresponding to one or more VAs of the plurality of sequential VAs. In such aspects, the processor may perform accelerated processing of the request by using the fetch circuit to fetch the one or more instructions from the FAC entry instead of from the instruction cache of the processor. According to some aspects, the metadata may include one or more instructions corresponding to a first subset of the plurality of sequential VAs, and may further include a set value and a way value for each of one or more cache lines corresponding to a second subset of the plurality of sequential VAs.

Figure 1:
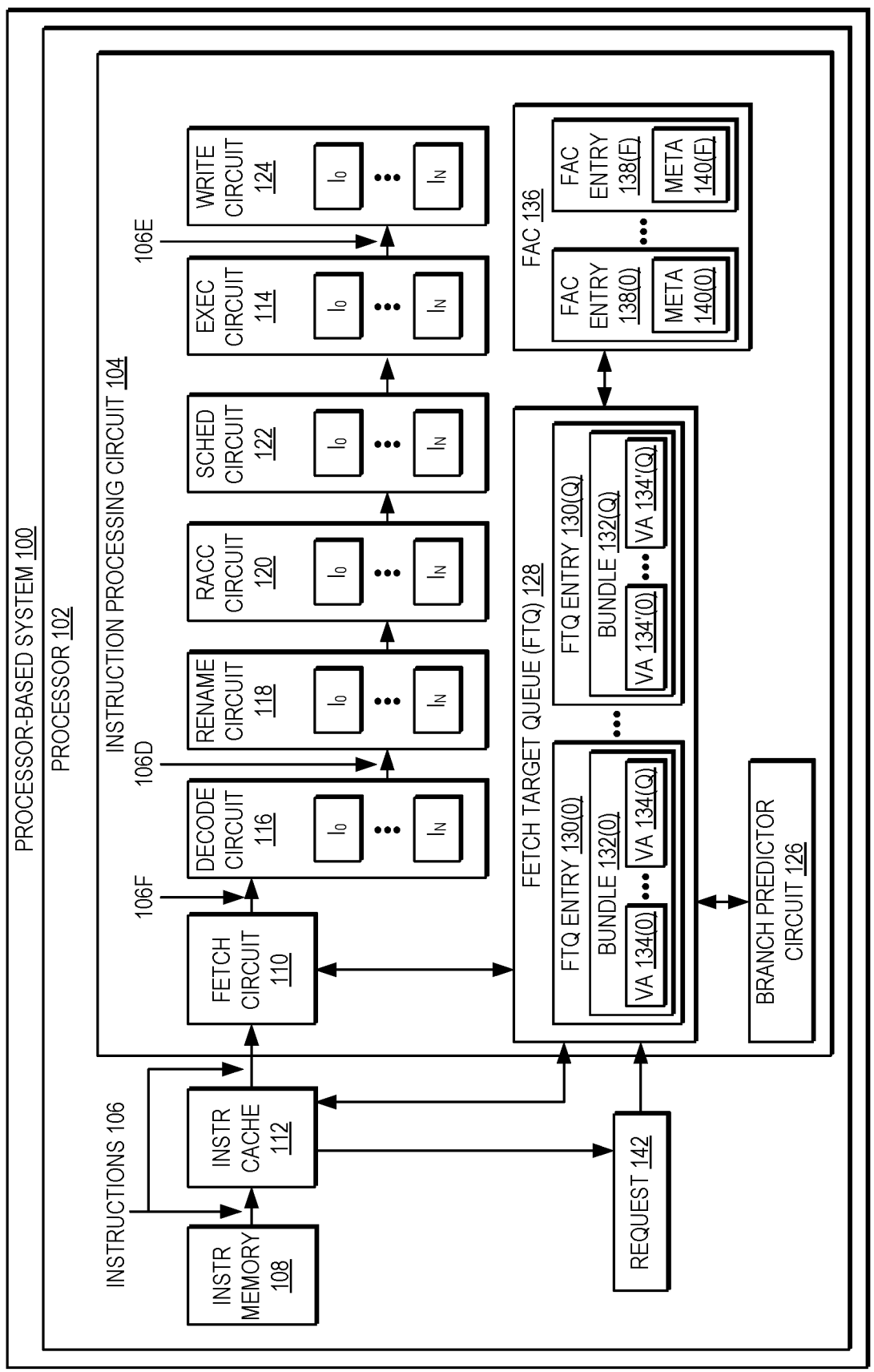
FIG. 1 is a diagram of an exemplary processor-based system that includes a processor comprising a fetch target queue (FTQ) and an FTQ acceleration cache (FAC) for accelerating FTQ processing, according to some aspects.

In this regard, FIG. 1 is a diagram of an exemplary processor-based system 100 that includes a processor 102. The processor 102, which also may be referred to as a "processor core" or a "central processing unit (CPU) core," may be an in-order or an out-of-order processor (OoP), and/or may be one of a plurality of processors 102 provided by the processor-based system 100. In the example of FIG. 1, the processor 102 includes an instruction processing circuit 104 that includes one or more instruction pipelines $I_0$-$I_N$ for processing instructions 106 fetched from an instruction memory (captioned as "INSTR MEMORY" in FIG. 1) 108 by a fetch circuit 110 for execution. The instruction memory 108 may be provided in or as part of a system memory in the processor-based system 100, as a non-limiting example. An instruction cache (captioned as "INSTR CACHE" in FIG. 1) 112 may also be provided in the processor 102 to cache the instructions 106 fetched from the instruction memory 108 to reduce latency in the fetch circuit 110. As used herein, the "instruction cache 112" refers generally both to elements used to tag and store cached data, as well as cache controller circuits used to manage access to cached data.

The fetch circuit 110 in the example of FIG. 1 is configured to provide the instructions 106 as fetched instructions 106F into the one or more instruction pipelines $I_0$-$I_N$ in the instruction processing circuit 104 to be pre-processed, before the fetched instructions 106F reach an execution circuit (captioned as "EXEC CIRCUIT" in FIG. 1) 114 to be executed. The instruction pipelines $I_0$-$I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 114.

With continuing reference to FIG. 1, the instruction processing circuit 104 includes a decode circuit 116 configured to decode the fetched instructions 106F fetched by the fetch circuit 110 into decoded instructions 106D to determine the instruction type and actions required. The instruction type and action required encoded in the decoded instruction 106D may also be used to determine in which instruction pipeline $I_0$-$I_N$ the decoded instructions 106D should be placed. In this example, the decoded instructions 106D are placed in one or more of the instruction pipelines $I_0$-$I_N$ and are next provided to a rename circuit 118 in the instruction processing circuit 104. The rename circuit 118 is configured to determine if any register names in the decoded instructions 106D should be renamed to decouple any register dependencies that would prevent parallel or out-of-order processing.

The instruction processing circuit 104 in the processor 102 in FIG. 1 also includes a register access circuit (captioned as "RACC CIRCUIT" in FIG. 1) 120. The register access circuit 120 is configured to access a physical register in a physical register file (PRF) (not shown) based on a mapping entry mapped to a logical register in a register mapping table (RMT) (not shown) of a source register operand of a decoded instruction 106D to retrieve a produced value from an executed instruction 106E in the execution circuit 114. The register access circuit 120 is also configured to provide the retrieved produced value from an executed instruction 106E as the source register operand of a decoded instruction 106D to be executed.

Also, in the instruction processing circuit 104, a scheduler circuit (captioned as "SCHED CIRCUIT" in FIG. 1) 122 is provided in the instruction pipeline $I_0$-$I_N$ and is configured to store decoded instructions 106D in reservation entries until all source register operands for the decoded instruction 106D are available. The scheduler circuit 122 issues decoded instructions 106D that are ready to be executed to the execution circuit 114. A write circuit 124 is also provided in the instruction processing circuit 104 to write back or commit produced values from executed instructions 106E to memory (such as the PRF), cache memory, or system memory.

With continuing reference to FIG. 1, the instruction processing circuit 104 also includes a branch predictor circuit 126. The branch predictor circuit 126 is configured to speculatively predict the outcome of a fetched branch instruction that controls whether instructions corresponding to a taken path or a not-taken path in the instruction control flow path are fetched into the instruction pipelines $I_0$-$I_N$ for execution. In this manner, the outcome of the fetched branch instruction does not have to be resolved in execution by the execution circuit 114 before the instruction processing circuit 104 can continue processing other fetched instructions.

To decouple branch prediction operations from instruction fetch operations, the processor 102 provides an FTQ 128 that is communicatively coupled to both the instruction cache 112 and the branch predictor circuit 126. The FTQ 128 comprises a plurality of FTQ entries 130(0)-130(Q), each of which stores a fetch address bundle (captioned as "BUNDLE" in FIG. 1) 132(0)-132(Q) that is generated by the branch predictor circuit 126. Each fetch address bundle 132(0)-132(Q) stores a plurality of sequential VAs (captioned as "VA" in FIG. 1) 134(0)-134(Q), 134'(0)-134'(Q) that correspond to a sequence of instructions predicted to be executed next by the branch predictor circuit 126. The instruction cache 112 and the fetch circuit 110 operate on the FTQ entries 130(0)-130(Q) of the FTQ 128 to fetch instructions to be processed by the instruction processing circuit 104. The FTQ 128 thus acts as a buffer between the instruction cache 112 and the branch predictor circuit 126, allowing the branch predictor circuit 126 to continue generating branch predictions (represented by the fetch address bundles 132(0)-132(Q) of FIG. 1) even if an access to the instruction cache 112 results in a miss.

However, as noted above, a miss to the instruction cache 112 may still negatively impact the fetch performance of the processor 102 even with the use of the FTQ 128 by slowing the rate at which the FTQ entries 130(0)-130(Q) can be processed. Accordingly, the processor 102 provides the FAC 136 to accelerate processing of the FTQ entries 130(0)-130(Q). As used herein, the "FAC 136" refers generally both to elements used to store cached data, as well as cache controller circuits used to manage access to the cached data. The FAC 136 comprises a plurality of FAC entries 138(0)-138(F), each of which corresponds to an FTQ entry of the plurality of FTQ entries 130(0)-130(Q). The FAC entries 138(0)-138(F) in some aspects may be virtually indexed and virtually tagged using a VA of the corresponding FTQ entry 130(0)-130(Q), such as the first sequential VAs 134(0), 134'(0) of the corresponding FTQ entries 130(0), 130(Q).

Each of the FAC entries 138(0)-138(F) stores metadata (captioned as "META" in FIG. 1) 140(0)-140(F) for the corresponding FTQ entry 130(0)-130(Q) that can be used to accelerate processing of requests for the corresponding FTQ entry 130(0)-130(Q). Thus, in exemplary operation, the processor 102 (i.e., using the FAC 136) is configured to generate a FAC entry, such as the FAC entry 138(0), that corresponds to an FTQ entry (e.g., the FTQ entry 130(0)) when the FTQ entry 130(0) is enqueued by the FTQ 128. Subsequently, when a request 142 to access the FTQ entry 130(0) is received by the FTQ 128 (e.g., from the instruction cache 112, as a non-limiting example), the processor 102 is configured to locate the FAC entry 138(0) corresponding to the FTQ entry 130(0) in the FAC 136. The processor 102 is configured to then perform accelerated processing of the request 142 using the metadata 140(0) of the FAC entry 138(0).

Figure 2:
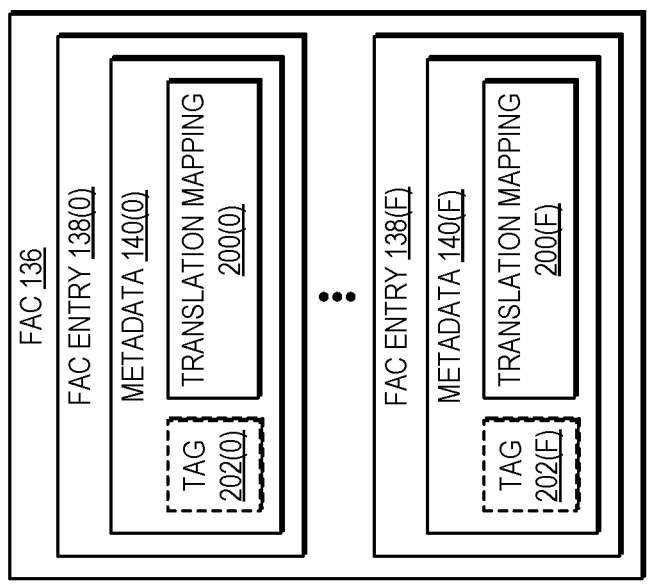
FIG. 2 is a diagram illustrating an exemplary FAC in which metadata includes a translation mapping for virtual addresses (VAs) in a corresponding FTQ entry, according to some aspects.
Figure 3:
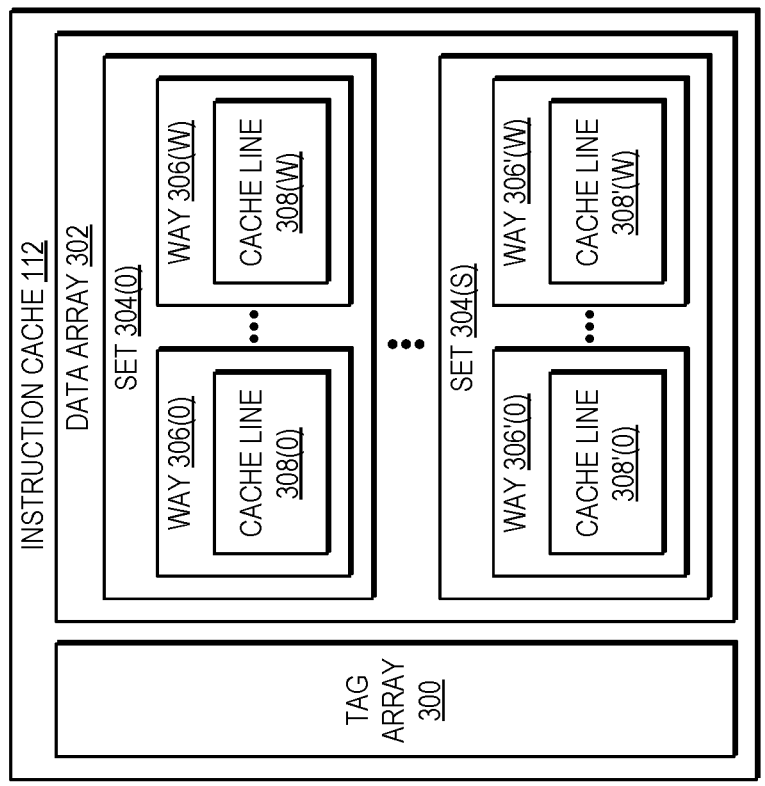
FIG. 3 is a diagram illustrating an exemplary FAC in which metadata includes set values and way values for cache lines corresponding to VAs in a corresponding FTQ entry, according to some aspects.
Figure 3:
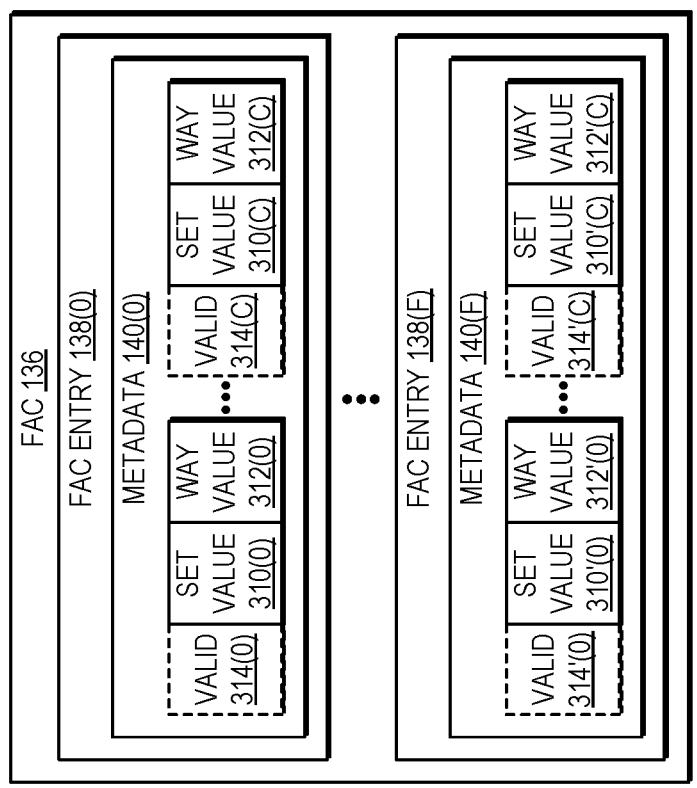

The use of different types of metadata 140(0)-140(F), and how each may be used in aspects disclosed herein to perform accelerated processing of the request 142, are discussed in greater detail below with respect to FIGS. 2-5. In particular, FIG. 2 illustrates an aspect in which the metadata 140(0)-140(F) includes translation mappings for the FTQ entries 130(0)-130(Q) corresponding to the FAC entries 138(0)-138(F), while FIG. 3 illustrates an area-efficient aspect in which the metadata 140(0)-140(F) includes set and way data indicating where cache lines corresponding to the sequential VAs 134(0)-134(Q), 134'(0)-134'(Q) are stored in the instruction cache 112. FIG. 4 illustrates a high-performance aspect in which the metadata 140(0)-140(F) includes the actual instructions corresponding to the sequential VAs 134(0)-134(Q), 134'(0)-134'(Q), and FIG. 5 illustrates a hybrid aspect that combines features of the aspects shown in FIGS. 3 and 4. It is to be understood that the features shown in FIGS. 2-5 may be combined in some aspects disclosed herein.

With reference now to FIG. 2, the FAC 136, the FAC entries 138(0)-138(F), and the metadata 140(0)-140(F) of FIG. 1 according to some aspects are illustrated in greater detail. The metadata 140(0)-140(F) shown in FIG. 2 comprise a plurality of translation mappings 200(0)-200(F) that each corresponds to one of the fetch address bundles 132(0)-132(Q) of the FTQ entries 130(0)-130(Q) of FIG. 1, and which represents a virtual-to-physical address mapping for the corresponding fetch address bundles 132(0)-132(Q). In some aspects, the translation mappings 200(0)-200(F) may be obtained by the processor 102 of FIG. 1 during conventional operations. For example, if the instruction cache 112 of FIG. 1 is a virtually indexed, physically tagged (VIPT) cache or a physically indexed, physical tagged (PIPT) cache, the processor 102 may perform translation mapping as part of accessing the instruction cache 112 and may capture the results of such translation mappings as the translation mappings 200(0)-200(F). The processor 102 in aspects according to FIG. 2 can subsequently use the metadata 140(0)-140(F) to perform accelerated processing of the request 142 of FIG. 1 by using the translation mappings 200(0)-200(F) to fetch instructions corresponding to the plurality of VAs 134(0)-134(Q), 134'(0)-134'(Q) of FIG. 1 without having to access other data structures such as translation lookaside buffers (TLBs).

Changes in translation state of the plurality of translation mappings 200(0)-200(F) may cause the FAC entries 138(0)-138(F) to grow stale over time, which may result in incorrect memory accesses. Accordingly, some aspects may provide that the processor 102 is configured to detect a change in a translation state of the plurality of translation mappings 200(0)-200(F). In response to detecting the change in the translation state, the processor 102 (e.g., using the FAC 136) may simply invalidate all of the plurality of FAC entries 138(0)-138(F). Some aspects may provide that each of the FAC entries 138(0)-138(F) includes a corresponding tag 202(0)-202(F) in which the translation state of the corresponding translation mapping 200(0)-200(F) is stored. If a change in the translation state for one or more of the FAC entries 138(0)-138(F) is detected, the FAC 136 in such aspects may invalidate only the one or more of the FAC entries 138(0)-138(F) based on the corresponding tags 202(0)-202(F).

FIG. 3 illustrates an area-efficient aspect of the FAC 136 of FIG. 1 and shows the FAC entries 138(0)-138(F) and the metadata 140(0)-140(F) of FIG. 1 according to some aspects. FIG. 3 also shows the instruction cache 112 of FIG. 1 in greater detail according to some aspects. As seen in FIG. 3, the instruction cache 112 comprises a tag array 300 in which tag data (not shown) for the data stored therein is maintained, and a data array 302 in which the actual cached data is stored. The data array 302 is organized into a plurality of sets 304(0)-304(S), each of which is further organized into a plurality of ways 306(0)-306(W), 306'(0)-306'(W). The ways 306(0)-306(W), 306'(0)-306'(W) store corresponding cache lines 308(0)-308(W), 308'(0)-308'(W), each of which may represent one or more cached instructions (not shown).

In the example of FIG. 3, the metadata 140(0)-140(F) stores set values 310(0)-310(C), 310'(0)-310'(C) and way values 312(0)-312(C), 312'(0)-312'(C) that indicate where cache lines, such as the cache lines 308(0)-308(W), 308'(0)-308'(W), that correspond to VAs of the plurality of sequential VAs 134(0)-134(Q), 134'(0)-134'(Q) of FIG. 1 are stored in the instruction cache 112. Thus, for example, the metadata 140(0) of the FAC entry 138(0) stores set values 310(0)-310(C) and way values 312(0)-312(C) that indicate sets and ways, respectively, where cache lines (e.g., the cache line 308(0)) corresponding to the plurality of sequential VAs 134(0)-134(Q) of the FTQ entry 130(0) are stored in the instruction cache 112. The processor 102 in aspects according to FIG. 3 can subsequently use the metadata 140(0)-140(F) to perform accelerated processing of the request 142 of FIG. 1 by using the set values 310(0)-310(C), 310'(0)-310'(C) and the way values 312(0)-312(C), 312'(0)-312'(C) to retrieve the cache lines 308(0)-308(W), 308'(0)-308'(W) by accessing the data array 302 of the instruction cache 112 directly, without accessing the tag array 300 of the instruction cache 112. This enables the processor 102 to access cached data in the instruction cache 112 in a more power-efficient manner while only storing a relatively small amount of data in the FAC 136.

In some aspects, the processor 102 of FIG. 1 may be configured to identify, e.g., the set 304(0) and the way 306(0) of the instruction cache 112 in which the cache line 308(0) is stored in the instruction cache 112 after generating the FAC entry 138(0) (for example, upon storing the cache line 308(0) in the instruction cache 112). The processor 102 may be configured to then update the set value 310(0) and the way value 312(0) of the FAC entry 138(0) to indicate the set 304(0) and the way 306(0).

The eviction of cache lines among the cache lines 308(0)-308(W), 308'(0)-308'(W) by the instruction cache 112 may cause the FAC entries 138(0)-138(F) of FIG. 3 to become stale over time, which may result in incorrect fetches using the set values 310(0)-310(C), 310'(0)-310'(C) and the way values 312(0)-312(C), 312'(0)-312'(C). Accordingly, to maintain coherence between the FAC 136 and the instruction cache 112, some aspects may provide that the processor 102 may be configured to detect an eviction of a cache line such as the cache line 308(0) from the instruction cache 112. In response to detecting the eviction, the FAC 136 may perform one or more of a number of operations. In some aspects, the FAC 136 invalidates the corresponding FAC entry 138(0), along with any other of the FAC entries 138(0)-138(F) that store the same pair of the set values 310(0)-310(C), 310'(0)-310'(C) and the way values 312(0)-312(C), 312'(0)-312'(C) for the cache line 308(0). Some aspects may provide that corresponding pairs of the set values 310(0)-310(C), 310'(0)-310'(C) and the way values 312(0)-312(C), 312'(0)-312'(C) are associated with valid indicators (captioned as "VALID" in FIG. 3) 314(0)-314(C), 314'(0)-314'(C). In such aspects, upon detecting the eviction of the cache line 308(0), the FAC 136 may set the valid indicator 314(0) associated with the set value 310(0) and the way value 312(0) to indicate that the set value 310(0) and the way value 312(0) for the cache line 308(0) are invalid. The FAC 136 likewise may set other valid indicators 314(0)-314(C), 314'(0)-314'(C) to indicate that corresponding set values 310(0)-310(C), 310'(0)-310'(C) and way values 312(0)-312(C), 312'(0)-312'(C) stored in other FAC entries 138(0)-138(F) for the cache line 308(0) are invalid.

FIG. 4 illustrates a high-performance aspect of the FAC 136 of FIG. 1 according to some aspects, and further illustrates the FAC entries 138(0)-138(F) and the metadata 140(0)-140(F) of FIG. 1 according to some aspects. In the example of FIG. 4, the metadata 140(0)-140(F) comprises instructions 400(0)-400(Q), 400'(0)-400'(Q) that correspond to the plurality of sequential VAs 134(0)-134(Q), 134'(0)-134'(Q) of FIG. 1. The instructions 400(0)-400(Q), 400'(0)-400'(Q) in some aspects may be captured when fetched by the fetch circuit 110 and used to populate the FAC entries 138(0)-138(F). The processor 102 of FIG. 1 may subsequently use the metadata 140(0)-140(F) to perform accelerated processing of the request 142 of FIG. 1 by using the fetch circuit 110 to fetch the instructions 400(0)-400(Q), 400'(0)-400'(Q) from the FAC entries 138(0)-138(F) instead of from the instruction cache 112 of FIG. 1, thus reducing energy consumption that would otherwise be incurred by accessing the instruction cache 112.

Some aspects may provide that the FAC 136 is configured to ensure that the metadata 140(0)-140(F) of FIG. 4 is maintained in a state that is coherent with the contents of the instruction cache 112. Thus, for example, the FAC 136 may be configured to detect a cache line invalidation by the instruction cache 112, and may be configured to update the metadata 140(0)-140(F) for one or more of the FAC entries 138(0)-138(F) and/or for individual ones of the instructions 400(0)-400(Q), 400'(0)-400'(Q) to indicate that the instructions 400(0)-400(Q), 400'(0)-400'(Q) corresponding to the cache line invalidation by the instruction cache 112 are invalid.

In FIG. 5, a hybrid aspect of the FAC 136 of FIG. 1 that incorporates features of the aspects shown in FIGS. 3 and 4 is shown. As seen in FIG. 5, the FAC entries 138(0)-138(F) and the metadata 140(0)-140(F) according to some aspects are illustrated. The metadata 140(0)-140(F) each includes one or more instructions 500(0)-500(X), 500'(0)-500'(X) that correspond to a first subset of the plurality of sequential VAs 134(0)-134(Q), 134'(0)-134'(Q) of FIG. 1, and further includes, for each cache line corresponding to a second subset of the plurality of sequential VAs 134(0)-134(Q), 134'(0)-134'(Q) of FIG. 1, one or more pairs of set values 502(0)-502(Z), 502'(0)-502'(Z) and way values 504(0)-504(Z), 504'(0)-504'(Z). The processor 102 of FIG. 1 may subsequently use the metadata 140(0)-140(F) to perform accelerated processing of the request 142 of FIG. 1 by using the fetch circuit 110 to fetch the instructions 500(0)-500(X), 500'(0)-500'(Q) from the FAC entries 138(0)-138(F), and also using the set values 502(0)-502(Z), 502'(0)-502'(Z) and the way values 504(0)-504(Z), 504'(0)-504'(Z) to fetch subsequent instructions from the instruction cache 112. In some aspects, each of the FAC entries 138(0)-138(F) may be configured to store different numbers of the instructions 500(0)-500(X), 500'(0)-500'(X). Some such aspects may associate each of the FAC entries 138(0)-138(F) with a hit counter (not shown). If the hit counter for a FAC entry such as the FAC entry 138(0) is determined to be above a threshold value (not shown), the FAC entry 138(0) may be configured to store more instructions 500(0)-500(X), 500'(0)-500'(X), and otherwise may be configured to store fewer or no instructions 500(0)-500(X), 500'(0)-500'(X).

To illustrate exemplary operations performed by the FAC 136 of FIGS. 1-5 for accelerating FTQ processing, FIGS. 6A-6C provide a flowchart showing exemplary operations 600. Elements of FIGS. 1-5 are referenced in describing FIG. 6A-6C for the sake of clarity. The exemplary operations 600 begin in FIG. 6A with the processor 102 (e.g., using the FAC 136 of FIGS. 1-5) generating a FAC entry (e.g., the FAC entry 138(0) of FIGS. 1-5) corresponding to an FTQ entry of a plurality of FTQ entries of an FTQ of the processor 102 (e.g., the FTQ entry 130(0) of the plurality of FTQ entries 130(0)-130(Q) of the FTQ 128 of FIG. 1), wherein the FTQ entry 130(0) comprises a fetch address bundle (e.g., the fetch address bundle 132(0) of FIG. 1) comprising a plurality of sequential VAs (e.g., the sequential VAs 134(0)-134(Q) of FIG. 1), the FAC entry 138(0) comprises metadata (e.g., the metadata 140(0) of FIGS. 1-5) for the FTQ entry 130(0) (block 602). In aspects such as those illustrated in FIG. 2, the operations of block 602 for generating the FAC entry 138(0) may comprise obtaining a translation mapping, such as the translation mapping 200(0) of FIG. 2 (block 604).

Some aspects, such as those illustrated in FIGS. 3 and 5, the processor 102 may identify a set and a way (e.g., the set 304(0) and the way 306(0), respectively, of FIG. 3) of an instruction cache (e.g., the instruction cache 112 of FIGS. 1 and 3) in which a cache line of a plurality of cache lines corresponding to the plurality of sequential VAs 134(0)-134(Q) (e.g., the cache line 308(0) of the plurality of cache lines 308(0)-308(W) of FIG. 3) is stored in the instruction cache 112 (block 606). The processor 102 then updates a set value and a way value (e.g., a set value 310(0) and a way value 312(0) of FIG. 3) of the FAC entry 138(0) to indicate the set 304(0) and the way 306(0) (block 608).

The FTQ 128 of the processor 102 subsequently receives a request (e.g., the request 142 of FIG. 1) to access the FTQ entry 130(0) (block 610). In response to receiving the request 142 to access the FTQ entry 130(0), a series of operations are performed (block 612). The FAC 136 locates the FAC entry 138(0) corresponding to the FTQ entry 130(0) among a plurality of FAC entries (e.g., the FAC entries 138(0)-138(F) of FIGS. 1-5) of the FAC 136 (block 614). The exemplary operations 600 then continue at block 616 of FIG. 6B.

Referring now to 6B, the operations of block 612 of FIG. 6A continue with the processor 102 performing accelerated processing of the request 142 to access the FTQ entry 130(0) using the metadata 140(0) of the FAC entry 138(0) (block 616). According to some aspects, such as those illustrated in FIG. 2, the operations of block 616 for performing accelerated processing of the request 142 may comprise a fetch circuit of an instruction processing circuit of the processor 102 (e.g., the fetch circuit 110 of the instruction processing circuit 104 of FIG. 1) fetching one or more instructions using the translation mapping 200(0) (block 618). In some aspects such as those illustrated in FIGS. 3 and 5, the operations of block 616 for performing accelerated processing of the request 142 may comprise the fetch circuit 110 accessing a data array (e.g., the data array 302 of FIG. 3) of the instruction cache 112 using the set value 310(0) and the way value 312(0) without accessing a tag array (e.g., the tag array 300 of FIG. 3) of the instruction cache 112 (block 620). Some aspects, such as those illustrated in FIGS. 4 and 5, the operations of block 616 for performing accelerated processing of the request 142 may comprise the fetch circuit 110 fetching one or more instructions (e.g., the instructions 400(0)-400(Q) of FIG. 4) from the FAC entry 138(0) instead of from the instruction cache 112 of the processor 102 (block 622). The exemplary operations 600 in some aspects may continue at block 624 of FIG. 6C.

Turning now to FIG. 6C, the processor 102 in some aspects may detect a change in the translation mapping 200(0) (block 624). In response to detecting the change in the translation state, the FAC 136 in some aspects may perform one or more of a number of operations (block 626). According to some aspects, the FAC 136 may invalidate the plurality of FAC entries 138(0)-138(F) (block 628). Some aspects may provide that the FAC 136 may invalidate the FAC entry 138(0) based on a tag (e.g., the tag 202(0) of FIG. 2) of the FAC entry 138(0) (block 630).

In some aspects, the processor 102 may detect an eviction of the cache line 308(0) from the instruction cache 112 (block 632). In response to detecting the eviction, the FAC 136 may perform one or more of a number of operations (block 634). Some aspects may provide that the FAC 136 invalidates the FAC entry 138(0) (block 636). According to some aspects, the FAC 136 may set a valid indicator (e.g., the valid indicator 314(0) of FIG. 3) of the metadata 140(0) to indicate that the set value 310(0) and the way value 312(0) for the cache line 308(0) are invalid (block 638).

FIG. 7 is a block diagram of an exemplary processor-based system 700 that includes a processor 702 (e.g., a microprocessor) that includes an instruction processing circuit 704 and a FAC 706 that corresponds in functionality to the FAC 136 of FIG. 1. The instruction processing circuit 704 can be the instruction processing circuit 104 in the processor 102 in FIG. 1 as an example. The processor-based system 700 can be the processor-based system 100 in FIG. 1 as an example. The processor-based system 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer.

In this example, the processor 702 represents one or more general-purpose processing circuits, such as a microprocessor, central processing unit, or the like. The processor 702 is configured to execute processing logic in instructions for performing the operations and steps discussed herein. In this example, the processor 702 includes an instruction cache 708 for temporary, fast access memory storage of instructions accessible by the instruction processing circuit 704. Fetched or prefetched instructions from a memory, such as from the system memory 710 over a system bus 712, are stored in the instruction cache 708. The instruction processing circuit 704 is configured to process instructions fetched into the instruction cache 708 and process the instructions for execution.

The processor 702 and the system memory 710 are coupled to the system bus 712 and can intercouple peripheral devices included in the processor-based system 700. As is well known, the processor 702 communicates with these other devices by exchanging address, control, and data information over the system bus 712. For example, the processor 702 can communicate bus transaction requests to a memory controller 714 in the system memory 710 as an example of a slave device. Although not illustrated in FIG. 7, multiple system buses 712 could be provided, wherein each system bus constitutes a different fabric. In this example, the memory controller 714 is configured to provide memory access requests to a memory array 716 in the system memory 710. The memory array 716 is comprised of an array of storage bit cells for storing data. The system memory 710 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 712. As illustrated in FIG. 7, these devices can include the system memory 710, one or more input device(s) 718, one or more output device(s) 720, a modem 722, and one or more display controllers 724, as examples. The input device(s) 718 can include any type of input device, including but not limited to input keys, switches, voice processors, etc. The output device(s) 720 can include any type of output device, including but not limited to audio, video, other visual indicators, etc. The modem 722 can be any device configured to allow exchange of data to and from a network 726. The network 726 can be any type of network, including but not limited to a wired or wireless network, a private or public network, a local area network (LAN), a wireless local area network (WLAN), a wide area network (WAN), a BLUETOOTH™ network, and the Internet. The modem 722 can be configured to support any type of communications protocol desired. The processor 702 may also be configured to access the display controller(s) 724 over the system bus 712 to control information sent to one or more displays 728. The display(s) 728 can include any type of display, including but not limited to a cathode ray tube (CRT), a liquid crystal display (LCD), a plasma display, etc.

The processor-based system 700 in FIG. 7 may include a set of instructions 730 to be executed by the processor 702 for any application desired according to the instructions. The instructions 730 may be stored in the system memory 710, processor 702, and/or instruction cache 708 as examples of a non-transitory computer-readable medium 732. The instructions 730 may also reside, completely or at least partially, within the system memory 710 and/or within the processor 702 during their execution. The instructions 730 may further be transmitted or received over the network 726 via the modem 722, such that the network 726 includes the computer-readable medium 732.

While the computer-readable medium 732 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memories, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising a fetch target queue (FTQ) and an FTQ acceleration cache (FAC);
the processor configured to:
  generate, using the FAC, a FAC entry uniquely corresponding to an FTQ entry of a plurality of FTQ entries of the FTQ, wherein:
    the FTQ entry comprises a fetch address bundle comprising a plurality of sequential virtual addresses (VAs);
    the FAC entry comprises metadata for the FTQ entry; and
    the FAC entry is virtually indexed and virtually tagged using an ordinal first VA of the plurality of sequential VAs of the FTQ entry;
  receive, using the FTQ, a request to access the FTQ entry; and
  responsive to receiving the request to access the FTQ entry:
    locate, using the FAC, the FAC entry corresponding to the FTQ entry among a plurality of FAC entries of the FAC; and
    perform accelerated processing of the request to access the FTQ entry using the metadata of the FAC entry.

2. The processor of claim 1, wherein:
the processor further comprises:
  an instruction processing circuit comprising a fetch circuit; and
  an instruction cache;
the metadata comprises a translation mapping corresponding to the fetch address bundle of the FTQ entry; and
the processor is configured to:
  generate the FAC entry by being configured to obtain the translation mapping; and
  perform the accelerated processing of the request to access the FTQ entry using the metadata of the FAC entry by being configured to fetch, using the fetch circuit, one or more instructions using the translation mapping.

3. The processor of claim 2, wherein the processor is further configured to:
detect a change in a translation state of the translation mapping; and
responsive to detecting the change in the translation state, invalidate the plurality of FAC entries.

4. The processor of claim 2, wherein:
the FAC entry comprises a tag comprising a translation state of the translation mapping; and
the processor is further configured to:
  detect a change in the translation state of the translation mapping; and
  responsive to detecting the change in the translation state, invalidate the FAC entry based on the tag of the FAC entry.

5. The processor of claim 1, wherein:
the processor further comprises:
  an instruction processing circuit comprising a fetch circuit; and
  an instruction cache comprising a tag array and a data array;
the metadata comprises a set value and a way value that indicate a set and a way, respectively, in which a cache line of a plurality of cache lines corresponding to the plurality of sequential VAs is stored in the instruction cache;
the processor is further configured to:
  identify a set and a way of the instruction cache in which the cache line of the plurality of cache lines corresponding to the plurality of sequential VAs is stored in the instruction cache; and
  update the set value and the way value of the FAC entry to indicate the set and the way; and
the processor is configured to perform the accelerated processing of the request to access the FTQ entry using the metadata of the FAC entry by being configured to access, using the fetch circuit, the data array of the instruction cache using the set value and the way value without accessing the tag array of the instruction cache.

6. The processor of claim 5, wherein the processor is further configured to:
detect an eviction of the cache line from the instruction cache; and
responsive to detecting the eviction, invalidate the FAC entry.

7. The processor of claim 5, wherein:
the metadata further comprises a valid indicator for each cache line of the plurality of cache lines; and
the processor is further configured to:
  detect an eviction of the cache line from the instruction cache; and
  responsive to detecting the eviction, set the valid indicator to indicate that the set value and the way value for the cache line are invalid.

8. The processor of claim 1, wherein:
the processor further comprises:
  an instruction processing circuit comprising a fetch circuit; and
  an instruction cache;
the metadata comprises one or more instructions corresponding to one or more VAs of the plurality of sequential VAs; and
the processor is configured to perform the accelerated processing of the request to access the FTQ entry using the metadata of the FAC entry by being configured to fetch, using the fetch circuit, the one or more instructions from the FAC entry instead of from the instruction cache.

9. The processor of claim 8, wherein:
the instruction cache comprises a tag array and a data array;

the one or more instructions comprises one or more instructions corresponding to a first subset of the plurality of sequential VAs;

the metadata further comprises a set value and a way value that indicate a set and a way, respectively, in which a cache line of a second subset of the plurality of sequential VAs is stored in the instruction cache; and the processor is configured to perform the accelerated processing of the request to access the FTQ entry using the metadata of the FAC entry by being further configured to access, using the fetch circuit, the data array of the instruction cache using the set value and the way value without accessing the tag array of the instruction cache.

10. A method for accelerating fetch target queue (FTQ) processing, comprising:

generating, using an FTQ acceleration cache (FAC) of a processor, a FAC entry uniquely corresponding to an FTQ entry of a plurality of FTQ entries of an FTQ of the processor, wherein:

the FTQ entry comprises a fetch address bundle comprising a plurality of sequential virtual addresses (VAs);

the FAC entry comprises metadata for the FTQ entry; and the FAC entry is virtually indexed and virtually tagged using an ordinal first VA of the plurality of sequential VAs of the FTQ entry;

receiving a request to access the FTQ entry; and responsive to receiving the request to access the FTQ entry:

locating, using the FAC, the FAC entry corresponding to the FTQ entry among a plurality of FAC entries of the FAC; and performing accelerated processing of the request to access the FTQ entry using the metadata of the FAC entry.

11. The method of claim 10, wherein:

the metadata comprises a translation mapping corresponding to the fetch address bundle of the FTQ entry;

generating the FAC entry comprises obtaining the translation mapping; and performing the accelerated processing of the request to access the FTQ entry using the metadata of the FAC entry comprises fetching, using a fetch circuit of an instruction processing circuit of the processor, one or more instructions using the translation mapping.

12. The method of claim 11, further comprising:

detecting a change in a translation state of the translation mapping; and responsive to detecting the change in the translation state, invalidating the plurality of FAC entries.

13. The method of claim 11, wherein:

the FAC entry comprises a tag comprising a translation state of the translation mapping; and the method further comprises:

detecting a change in the translation state of the translation mapping; and responsive to detecting the change in the translation state, invalidating the FAC entry based on the tag of the FAC entry.

14. The method of claim 10, wherein:

the metadata comprises a set value and a way value that indicate a set and a way, respectively, in which a cache line of a plurality of cache lines corresponding to the plurality of sequential VAs is stored in an instruction cache of the processor; and the method further comprises:

identifying a set and a way of the instruction cache in which the cache line of the plurality of cache lines corresponding to the plurality of sequential VAs is stored in the instruction cache; and updating the set value and the way value of the FAC entry to indicate the set and the way; and performing the accelerated processing of the request to access the FTQ entry using the metadata of the FAC entry comprises accessing, using a fetch circuit of an instruction processing circuit of the processor, a data array of the instruction cache using the set value and the way value without accessing a tag array of the instruction cache.

15. The method of claim 14, wherein the method further comprises:

detecting an eviction of the cache line from the instruction cache; and responsive to detecting the eviction, invalidating the FAC entry.

16. The method of claim 14, wherein:

the metadata further comprises a valid indicator for each cache line of the plurality of cache lines; and the method further comprises:

detecting an eviction of the cache line from the instruction cache; and responsive to detecting the eviction, setting the valid indicator to indicate that the set value and the way value for the cache line are invalid.

17. The method of claim 10, wherein:

the metadata comprises one or more instructions corresponding to one or more VAs of the plurality of sequential VAs; and performing the accelerated processing of the request to access the FTQ entry using the metadata of the FAC entry comprises fetching, using a fetch circuit of an instruction processing circuit of the processor, the one or more instructions from the FAC entry instead of from an instruction cache of the processor.

18. The method of claim 17, wherein:

the one or more instructions comprises one or more instructions corresponding to a first subset of the plurality of sequential VAs;

the metadata further comprises a set value and a way value that indicate a set and a way, respectively, in which a cache line of a second subset of the plurality of sequential VAs is stored in the instruction cache; and performing the accelerated processing of the request to access the FTQ entry using the metadata of the FAC entry further comprises accessing, using the fetch circuit, a data array of the instruction cache using the set value and the way value without accessing a tag array of the instruction cache.

19. A non-transitory computer-readable medium having stored thereon computer-executable instructions that, when executed, cause a processor to:

generate a fetch target queue (FTQ) acceleration cache (FAC) entry uniquely corresponding to an FTQ entry of a plurality of FTQ entries of an FTQ of the processor, wherein:

the FTQ entry comprises a fetch address bundle comprising a plurality of sequential virtual addresses (VAs);

the FAC entry comprises metadata for the FTQ entry; and the FAC entry is virtually indexed and virtually tagged using an ordinal first VA of the plurality of sequential VAs of the FTQ entry;

receive a request to access the FTQ entry; and responsive to receiving the request to access the FTQ entry:

locate, within a FAC, the FAC entry corresponding to the FTQ entry among a plurality of FAC entries of the FAC; and perform accelerated processing of the request to access the FTQ entry using the metadata of the FAC entry.

20. The non-transitory computer-readable medium of claim 19, wherein:

the metadata comprises a translation mapping corresponding to the fetch address bundle of the FTQ entry;

the computer-executable instructions cause the processor to generate the FAC entry by causing the processor to obtain the translation mapping; and the computer-executable instructions cause the processor to perform the accelerated processing of the request to access the FTQ entry using the metadata of the FAC entry by causing the processor to fetch one or more instructions using the translation mapping.

\* \* \* \* \*